United States Patent [19]

Cannon

[11] 4,245,275
[45] Jan. 13, 1981

[54] REFRACTORY METAL ALLOY CASE CAPACITOR

[75] Inventor: Henry T. Cannon, Newberry, S.C.
[73] Assignee: Mepco/Electra, Inc., Columbia, S.C.
[21] Appl. No.: 918,673
[22] Filed: Jun. 23, 1978
[51] Int. Cl.³ .............................................. H01G 9/00
[52] U.S. Cl. ................................................. 361/433
[58] Field of Search ....................... 361/433; 252/62.2

[56] References Cited
U.S. PATENT DOCUMENTS

| | | | |
|---|---|---|---|
| 3,290,561 | 12/1966 | Burnham | 252/62.2 X |
| 3,697,823 | 10/1972 | Correll | 361/433 |
| 3,757,172 | 9/1973 | Ruben | 252/62.2 X |
| 3,845,364 | 10/1974 | Shoot | 361/433 |

Primary Examiner—James W. Davie
Attorney, Agent, or Firm—Thomas A. Briody; Robert T. Mayer; James J. Cannon, Jr.

[57] ABSTRACT

A liquid electrolyte porous anode capacitor having a tantalum alloy metal case which is acid resistant and having a porous film-forming coating on the internal surface thereof. The capacitor provides favorable performance to the prior all tantalum case wet slug capacitor.

11 Claims, 1 Drawing Figure

U.S. Patent
Jan. 13, 1981
4,245,275
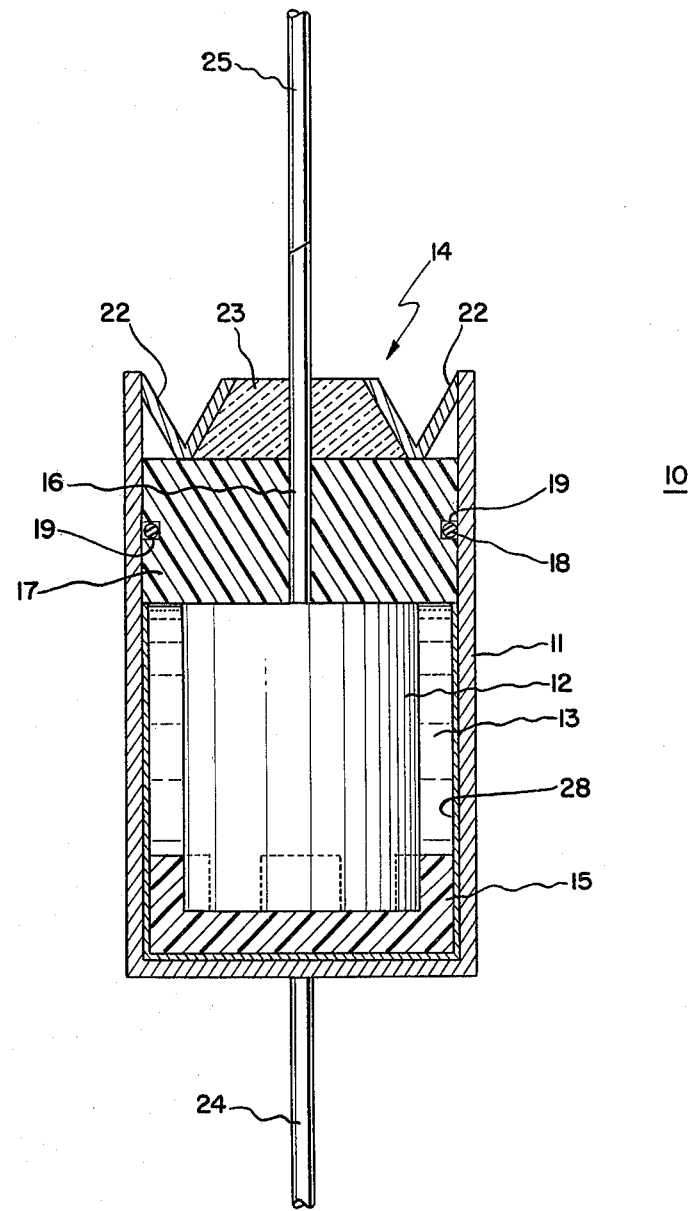

REFRACTORY METAL ALLOY CASE CAPACITOR

FIELD OF THE INVENTION

The present invention relates to electrolytic capacitors, and more particularly to an electrolytic capacitor wherein the can or casing is formed principally of a tantalum alloy and a sulphate additive is incorporated in the electrolyte to increase the acid resistance of the alloy can.

DESCRIPTION OF THE PRIOR ART

Electrolytic capacitors of the sintered tantalum pellet anode type, usually designated as a "slug" type of tantalum electrolytic capacitor, generally contain a highly corrosive eletrolyte such as a sulphuric acid electrolyte. Of necessity, the cases of such capacitors are made of suitable acid resistant materials. Silver or silver coated cases have been used for these capacitors. Tantalum has also been used for the case material and is particularly advantageous where the sintered anode is also tantalum, but there are also some disadvantages to the use of tantalum, such as high costs and difficult workability. However, substitutes also have disadvantages, mainly in acid resistance characteristics. It has now been discovered that certain alloys of tantalum are or may be made compatible with the kind of capacitor described, to be fully effective.

SUMMARY OF THE INVENTION

In accordance with a preferred form of this invention, a porous anode electrolytic capacitor is provided which utilizes an acid resistant tantalum alloy for the case or cathode. Tantalum, which is alloyed with a further refractory metal, is compatible with a sulphuric acid specific electrolyte, and provides proper end sealing characteristics.

BRIEF DESCRIPTION OF THE DRAWING

This invention will be better understood from the following description in conjunction with the accompanying drawing wherein:

The FIGURE illustrates an electrolytic porous anode capacitor to which the present invention is applicable.

DESCRIPTION OF THE PREFERRED EMBODIMENTS

Referring now to the FIGURE, there is illustrated a typical electrolytic capacitor to which this invention is directed. In the FIGURE, capacitor 10 comprises a casing 11 which contains the anode 12, electrolyte 13, and a seal assembly 14. In this kind of capacitor, the anode 12 is of a porous sintered metal such as tantalum, and rests upon a suitable insulating and non-reactive inner support member 15 in casing 11. Anode 12 is connected externally of the casing by means of an anode lead 16 which extends upwardly through an inert plastic, i.e., PTFE, elastomer bushing member 17 with elastomeric "O" ring 18 in angular groove 19, all part of the seal arrangement 14.

In the kind of capacitor illustrated and described, which is sometimes referred to as a wet slug capacitor, the casing material for casing 11 is usually of a hard or refractory material such as tantalum. Tantalum is highly resistant to acid electrolytes and is widely used as a replacement for former silver cases.

It has now been discovered that a casing made of a single material, such as tantalum, may be replaced with casing materials comprising alloys of tantalum with materials such as niobium, zirconium, and other refractory metals. It would appear that the single material case represents an uneconomical and unnecessary means to obtain a capacitor with the equivalent characteristics of either a silver case capacitor or a tantalum case capacitor. Consequently by the use of alloy materials, the high resistance to acid electrolytes is retained, equivalent electrical characteristics are obtained, and a more economical capacitor is produced.

Alloys which are suitable for use for the capacitor case 11 are those alloys of the refractory materials such as alloys of tantalum, niobium and zirconium. More particularly, the tantalum-niobium alloys are more readily commercially available and react favorably in combination with a tantalum anode. Representative tantalum-niobium alloys may range from as low as 1% tantalum by weight to as much as 99% tantalum by weight it being preferred that the tantalum constitute at least about 60% by weight. Suitable alloys include those containing, by weight, 26–29% tantalum, 10–12% tungsten, 0.6–1.1% zirconium, and the balance essentially niobium, specific examples including an alloy containing by weight 28% tantalum, 10.5% tungsten, 0.9% zirconium and 62% niobium. Another example includes 80% niobium, 10% tungsten and 10% tantalum. This invention also includes alloy cases where other refractory metals such as zirconium and niobium predominate. Where significant amounts of titanium are employed, the electrolyte should be lithium chloride. In one preferred example of this invention, capacitor cases 11 were made with a 60% tantalum - 40% niobium alloy. This alloy shows excellent acid resistance characteristics and lowering embrittlement which is a serious factor in these metals. The niobium material has a lower melting point than tantalum, and its presence in the alloy reduces the temperatures required for manufacturing such cases and capacitors.

For the capacitors as described in the present invention, it is a common procedure to deposit a porous, film forming coating of metal on the inside of the casing 11 in order to increase the cathodic area. Usually a refractory metal is employed for such a coating. In a preferred form of this invention, a tantalum powder coating 18 is employed. In order to provide the powdered coating 18, various coating techniques may be employed, including spraying, brushing and sintering. In one technique, a paste or slurry is prepared by mixing tantalum powder in a liquid vehicle which includes a binder such as methyl methacrylate, ethyl methacrylate, butyl methacrylate, or copolymers, and a solvent such as acetone, toluene or substituted glycol ether. A coating of this paste or slurry is provided on the casing walls and thereafter the coated casing is fired in a vacuum furnace at temperatures above about 1400° C. sc that the tantalum particles are sintered to the casing wall. An alternate technique involves tantalum powder, hydroxypropyl methyl cellulose binder and methanol-water solvent slurry brushed on the inside of the casing 11 and heat dried, followed by sintering.

In combination with the casing 11 and the porous coating 18 thereon, a 20%–40% $H_2SO_4$ electrolyte is employed. It has been found, however, that the casing as thus described may require, under some circumstances, additional resistance to acid electrolytes as compared to a casing 11 of a single material such as tantalum. It has been discovered in this invention that the addition of sulphates of the various casing metals, such as titanium, tungsten, vanadium, zirconium and molybdenum sulphate in the present instance, to the electrolyte contributes to the acid resistance of the casing. It is not necessary for the sulphate to be that of the case metal. For example, the addition of from about 250 PPM to about 1.0% by weight of titanium sulphate to a 35% $H_2SO_4$ electrolyte in a 60% tantalum 40% niobium casing retarded the attack to less than 1% weight loss in a 30,000 hour life test of the capacitor.

The casing 11 is sealed by means of a well known glass-to-metal seal assembly 14. Glass to metal seal assembly 14 is typical of seal assemblies, for example as shown in U.S. Pat. No. 3,697,823 to Correll. In the present invention the glass to metal seal includes a header ring member 22 of tantalum, niobium, or a tantalum alloy in order to be closely matched to the tantalum alloy of casing 11. Header ring 22 must comprise a metal which is capable of being bonded not only to the metal of the casing 11, but also to the glass body 23. A particular acid resistant glass for this glass metal seal is described in U.S. Pat. Nos. 3,669,698 and 3,697,823. Typically, such a glass comprises 63-65% $SiO_2$, 2-3% $Al_2O_3$, 2-3% NaO, 6-8% $K_2O$, 15-17% by weight of $B_2O_3$, 0-2% CaO, 4-6% BaO, 0.2-1.0% $Cr_2O_3$, all percentages being by weight. Elastomer seals such as shown in U.S. Pat. No. 3,684,927 can also be used in the present invention. This kind of elastomer seal uses a compressible elastomer, under the glass-to-metal seal, in a cavity in bushing 17. The compressible material surrounds lead 16 and is compressed into sealing engagement. In order to bond the header ring 22 to the casing 11, it is preferred to use laser or electron beam welding. In order to complete the capacitor, a cathode lead 24 is welded to casing 11 while an anode lead extension 25 is welded to anode lead 16 as a transition lead from the glass and metal seal assembly 14.

Representative capacitors made in accordance with the teachings of the present invention have indicated several excellent characteristics. For example, the present invention which does not have a silver case is able to withstand acid electrolytes up to about 35% sulphuric acid at 125° C. more than 20,000 hours. In addition, the casing and porous material cathode are able to be formed in a reverse direction up to 3 volts while retaining high capacitance. The addition of titanium sulphate to sulphuric acid also retards the attack of the acid on the case metal. Where the case metal includes a significant amount of titanium, the electrolyte should be lithium chloride.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim and desire to secure by Letters Patent of the United States is:

1. In an electrolytic capacitor comprising a porous refractory metal anode submerged in an electrolyte, said electrolyte and anode being contained in a refractory metal case, said case having a porous metal coating internally thereof, the improvement comprising:
said case consisting essentially of an alloy of tantalum-niobium and having a porous film forming coating on the internal surfaces thereof.

2. The capacitor as recited in claim 1 wherein said alloy is a tantalum-niobium alloy and said porous coating is tantalum.

3. The capacitor as recited in claim 2 wherein said case includes at least about 60% by weight of tantalum.

4. The capacitor as recited in claim 3 wherein said electrolyte is sulphuric acid and includes as an additive a sulfate of a metal selected from the group consisting of titanium, vanadium, tungsten, niobium, and zirconium.

5. The capacitor of claim 4 wherein said sulphate is titanium.

6. The capacitor as recited in claim 5 wherein said case is closed by a glass-to-metal seal.

7. The capacitor of claim 1 wherein said alloy consists essentially of about, by weight, 26-29% tantalum, 10-12% tungsten, 0.6-1.1% zirconium, and the balance niobium.

8. The capacitor of claim 7 wherein said electrolyte consists essentially of lithium chloride.

9. The capacitor of claim 1 wherein said alloy consists essentially of about, by weight, 28% tantalum, 10.5% tungsten, 0.9% zirconium, and 62% niobium.

10. The capacitor of claim 1, wherein said alloy consists essentially of about, by weight, 80% niobium, 10% tungsten, and 10% tantalum.

11. The capacitor of claim 1 wherein said alloy consists essentially of about, by weight, 60% tantalum, and 40% niobium.

* * * * *